US007400064B2

(12) United States Patent
Hoon et al.

(10) Patent No.: US 7,400,064 B2
(45) Date of Patent: Jul. 15, 2008

(54) DC/DC POWER CONVERTER

(75) Inventors: Siew Kuok Hoon, Dallas, TX (US); Norman L. Culp, Montgomery, TX (US); Jun Chen, Allen, TX (US); Franco Maloberti, Torre D'Isola (IT)

(73) Assignee: Texas Instruments Incorporated, Dallas, TX (US)

( * ) Notice: Subject to any disclaimer, the term of this patent is extended or adjusted under 35 U.S.C. 154(b) by 187 days.

(21) Appl. No.: 11/112,266

(22) Filed: Apr. 22, 2005

(65) Prior Publication Data

US 2006/0238029 A1 Oct. 26, 2006

(51) Int. Cl.
*H02J 1/00* (2006.01)
*G05F 1/56* (2006.01)
*H02M 3/335* (2006.01)

(52) U.S. Cl. ............................ 307/39; 307/31; 323/284; 363/21.11; 363/21.17; 363/21.18; 363/25

(58) Field of Classification Search .................. 307/31, 307/39; 315/296, 299, 300, 301, 302
See application file for complete search history.

(56) References Cited

U.S. PATENT DOCUMENTS

| 4,899,269 | A | * | 2/1990 | Rouzies ........................ 363/41 |
| 5,912,552 | A | | 6/1999 | Tateishi ........................ 323/285 |
| 6,069,804 | A | | 5/2000 | Ingman et al. ................ 363/21 |
| 6,075,295 | A | | 6/2000 | Li .................................. 307/39 |
| 6,163,142 | A | | 12/2000 | Tsujimoto .................... 323/283 |
| 6,265,855 | B1 | * | 7/2001 | Aas et al. ...................... 323/272 |
| 6,369,525 | B1 | | 4/2002 | Chang et al. ................. 315/300 |
| 6,586,890 | B2 | | 7/2003 | Min et al. ..................... 315/224 |
| 2004/0080962 | A1 | | 4/2004 | Charych ....................... 363/97 |
| 2004/0257055 | A1 | * | 12/2004 | Aioanei ........................ 323/282 |
| 2006/0087303 | A1 | * | 4/2006 | Hartular et al. .............. 323/283 |
| 2006/0098463 | A1 | * | 5/2006 | Baurle et al. ................. 363/21.01 |

\* cited by examiner

*Primary Examiner*—Michael J Sherry
*Assistant Examiner*—Hal I Kaplan
(74) *Attorney, Agent, or Firm*—Ronald O. Neerings; Wade J. Brady, III; Frederick J. Telecky, Jr.

(57) ABSTRACT

A switching regulation system and control scheme efficiently enables driving multiple loads from a common energy storage element, such as an inductor. The control scheme operates to store energy in the energy storage element over a first portion of a cycle, such as by ramping up current through an inductor, according to energy requirements of the multiple loads. After storing the energy in the storage element during the first portion of the cycle, the stored energy is delivered consecutively to each of the multiple loads over a subsequent portion of the cycle.

17 Claims, 4 Drawing Sheets

DC/DC POWER CONVERTER

TECHNICAL FIELD

The present invention relates generally to electrical circuits and signal processing and, more particularly, to DC/DC power conversion.

BACKGROUND

DC-DC converters are employed in a variety of applications. DC-DC converters operate by converting an applied DC voltage (usually unregulated) into either a higher or lower regulated DC voltage. DC-DC converters are used in a variety of applications, including power supplies for computers, personal digital assistants, cellular phones and other hand held or portable electronic devices and systems. Each application may have specific demands and performance requirements.

One type of DC-DC converter is a switching converter. Switching converters are often used in portable (e.g., battery powered) devices, as they tend to provide improved efficiency over dissipative conversion methods. In such switched-mode DC-DC converters, an unregulated input voltage is converted into a periodic pulse waveform that has an average value which varies with the ratio of the pulse width to the pulse period. The average value of the pulse waveform may be extracted using filtering techniques, typically including the use of passive filtering components such as capacitors and inductors.

As a practical matter, the use of a high switching frequency in a switched-mode DC-DC converter is desirable because it permits a reduction in the size and weight of the passive filtering components. Switching frequencies in excess of 500 kHz in switched-mode DC-DC converters are common, and the use of large field effect transistors (FETs) as the switching element in the DC-DC converters has facilitated the increase in switching frequency. However, as the switching frequency increases, switching losses during the transition of the switch from "off" to "on" and from "on" to "off" also increase. This is due to the fact that during these transitions, the current passing through the switch and the voltage across the switch both have positive values resulting in a positive voltage-times-current (VI) product, and thus power dissipation. These are known as switch transition losses and are undesirable because they tend to degrade conversion efficiency.

SUMMARY

The present invention relates to a switching regulation system and control scheme that efficiently enables driving multiple loads from a common energy storage element, such as an inductor. The control scheme operates to store energy in the energy storage element over a first portion of a cycle, such as by ramping up current through an inductor, according to energy requirements of the multiple loads. The energy requirements can be set based on the value of a predetermined input signal. After storing the energy in the storage element during the first portion of the cycle, the stored energy is delivered consecutively to each of the multiple loads over a subsequent portion of the cycle and a discontinuous mode is provided prior to beginning the first portion of a next cycle. This scheme can repeated over any number of cycles, as needed, to provide power to each of the multiple loads. The particular order energy is delivered to each of the loads can vary from cycle to cycle. Additionally, it is possible that one or more of the multiple loads can be disabled during a given cycle, such that different numbers of loads may be energized in different cycles. The amount of energy stored and delivered to the loads also may be varied.

One embodiment of the present invention may include a power converter that comprises at least two switch devices coupled to receive electrical energy from a common energy storage device (e.g., an inductor). Each of the switch devices is coupled to regulate an associated output, such as may be set based on the value of a predetermined input signal. A control system, after causing electrical energy to be stored in the common energy storage device during a first portion of a given cycle, controls the switch devices consecutively to deliver the stored electrical energy to the associated output during a second portion of the given cycle.

DETAILED DESCRIPTION

Figure 1:
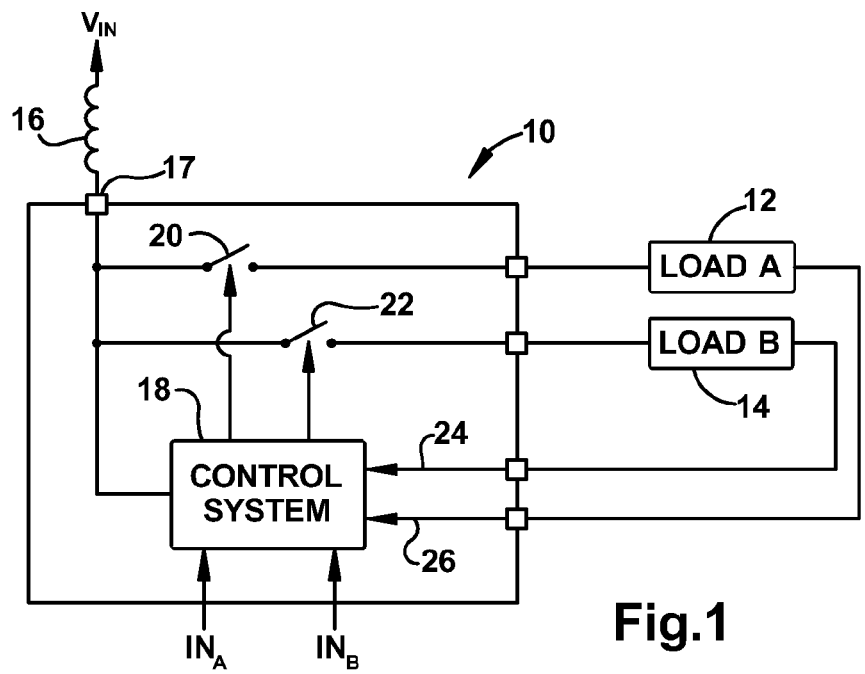
FIG. 1 illustrates an example of a system for regulating multiple outputs according to an aspect of the present invention.

FIG. 1 depicts an example of a switching regulation system 10 that can be utilized to deliver electrical energy to multiple loads. The switching regulation system 10 is operative to implement a control scheme that can efficiently drive multiple loads 12 and 14 from a common energy storage element, such as an inductor 16. While FIG. 1 depicts two loads 12 and 14, indicated at Load A and Load B, it is to be understood and appreciated that the switching regulation system 10 can be utilized to provide regulated electrical energy (e.g., voltage) to more than two loads. Additionally, the storage element 16 may be implemented as one or more inductors or one or more other energy storage devices that form a shared power train for delivering electrical energy to the loads 12 and 14.

In the example of FIG. 1, the energy storage element 16 is depicted as a single inductor that is coupled between an input voltage ($V_{IN}$) and an input node 17 of the switching regulation system 10. Thus, the switching regulation system 10 can utilize a common energy storage element 16 to deliver electrical energy to the respective loads 12 and 14. For instance, the switching regulation system 10 can share electrical energy stored in the storage element 16 to drive the respective loads 12 and 14 in a time multiplexing manner.

The switching regulation system 10 includes a control system 18 that controls operation of the switching regulation system for providing regulated electrical energy to the respective loads 12 and 14. The predetermined electrical energy can include a regulated DC voltage that is supplied to each of the loads (e.g., in a range from about 3V to about 25V). The predetermined electrical energy that is supplied to each load 12, 14 can also control the output current (e.g., in a range from about 5 mA to about 30 mA). That is, the switching regulation system 10 can operate as a DC-DC boost converter, although the control may implement other types of power conversion.

A first switch device 20 is connected between the input node 17 and the load 12 and a second switch device 22 is connected between the input node and the other load 14. As used herein, the term "switch device" can be any type of semiconductor or solid state component or combination of components capable of operating in a conductive state that permits current to flow through the device and a non-conductive state that inhibits the flow of current. Examples of switch devices include field effect transistors (FETs), thyristors, relays and the like. In the context of integrated circuit, the switch devices typically can be implemented as power metal oxide semiconductor FETs (MOSFETs), such as p-channel or n-channel devices. The control system 18 controls the switch devices 20 and 22 for providing the regulated electrical energy the respective loads 14 and 16. The regulated electrical energy that is provided to the respective load 12 and 14 can be set by input signals, indicated at $IN_A$ and $IN_B$. The input signals can be analog or digital values set by a user to define the amount of electrical energy that is supplied to each of the loads 12 and 14. The amount of electrical energy for each load 12 and 14 may be the same or different, such as depending on the type of load and performance requirements.

In operation, the control system 18 causes energy to be stored in the energy storage element 16 (e.g., in its magnetic field) over a first portion of a cycle. For example, the control system 18 can ramp up current through the inductive storage element 16 according to energy requirements of the loads 12 and 14. After sufficient energy has been stored in the energy storage element 16, the control system 18 controls the switch devices 20 and 22 to deliver the stored electrical energy consecutively to each of the multiple loads 12 and 14 over a subsequent portion of the cycle.

By way of example, the control system 18 activates switch device 20 to its conductive state, to electrically couple the storage element 16 with the load 12 for first phase of the subsequent portion of the given cycle. The portion of the cycle that switch device 20 is activated is of sufficient duration to maintain regulated voltage at the output to which the load 12 is connected. As mentioned above, the regulated voltage for the load 12 is defined by $IN_A$. The control system 18 then activates switch device 22 to its conductive state (and concurrently deactivates the switch device 20) to electrically couple the storage element 16 with the load 14 for a second phase of the subsequent portion of the given cycle. The remaining energy stored in the storage element is delivered to the load 14 to provide the regulated voltage at the output to which the load 14 is connected, as defined by $IN_B$. Each of the loads 12 and 14 can include other energy storage devices, such as one or more capacitors, to help maintain the desired regulated DC voltage at the outputs of the switching regulation system 10.

The control system 18 can monitor electrical characteristics associated with the loads 12 and 14 by feedback signals, indicated at 24 and 26. The feedback signals 24 and 26, for instance, can provide an indication of the current through the respective load 12 and 14. The control system can control the switching between the switch devices 20 and 22 based on one or more of the feedback signals relative to respective set point input signals $IN_A$ and $IN_B$. The control system 18 can also employ the feedback signals to set the duty cycle of the current through the storage element 16.

Prior to drawing additional current through the inductor 16 for storing energy for a next cycle, the control system 18 can implement a discontinuous mode to mitigate cross regulation of the respective load 12 and 14 and reduce the effects of switching noise on the regulated output voltage. During the discontinuous mode, the current through the energy storage element 16 is substantially zero and the switch devices 20 and 22 are operated in a non-conductive state. The length of the discontinuous mode relative to the duration of a given cycle can vary depending on, for example, the amount of electrical energy that is to be delivered to the respective loads each cycle. The particular order that energy is delivered to each of the loads 12 and 14 can vary from cycle to cycle or the order may be fixed.

Figure 2:
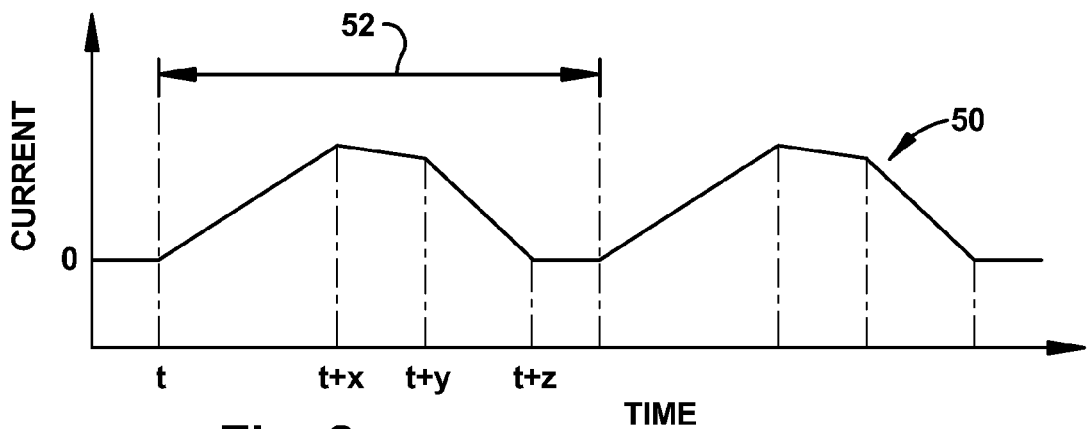
FIG. 2 is an example graph depicting inductor current verses time associated with driving multiple loads according to an aspect of the present invention.

The control scheme that is utilized to provide the regulated output to the loads 12 and 14 will be better appreciated with respect to FIG. 2. For purposes of simplification of explanation, the graph of FIG. 2 is described in the context of the switching regulation system of FIG. 1 with the storage element 16 comprising an inductor, although the control scheme is not limited to the example configuration of FIG. 1.

FIG. 2 depicts an example of a graph of inductor current (in arbitrary units) 50 as a function of time over a plurality of cycles. A first complete cycle is indicated at 52. At some time t, the control system 18 causes current to be drawn through the inductor 16 for a first portion of the cycle 52, namely, the inductor current ramps up until time t+x. The time value "x" denotes a relative time for charging the inductor 16 to a sufficient level to supply power to the multiple outputs. The control system 18, for example, activates switching circuitry (not shown) to pull current through the inductor 16 for the duration x based on the energy requirements of the loads 12 and 14 to maintain desired regulated power. At time t+x, the control system 18 activates switch device 20 to its conductive state, such that the inductor 16 supplies electrical current to the load 12 through the switch device 20. The control system 18 can implement control to discontinue drawing current through the inductor 16 concurrently with activating the switch device 20 at time t+x. The discharging of the energy from the inductor 16 results in a corresponding decrease in the inductor current 50 between time t+x and time t+y.

At time t+y, the control system 18 activates the switch device 22 to its conductive state such that the inductor 16 supplies electrical current to the load 14 through the switch device 22. At time t+y, the control system can concurrently open the switch device 20. During this part of the cycle 52 (between time t+y and time t+z), the inductor current 50 decreases with an increased negative slope relative to the portion of the cycle between time t+x and time t+y, wherein the remaining stored energy is provided to drive the load 14. At time t+z, the inductor current reaches zero. From time t+z to the end of the cycle 52, the switching regulation system can operate in a discontinuous mode in which the inductor current 50 is zero and the switch devices 20 and 22 are in non-conductive states. The discontinuous mode between cycles mitigates cross regulation of the respective outputs. After the cycle 52 ends, another cycle can begin and repeat the ramping up of the current through the inductor followed by the consecutive and independent operation of the switch devices 20 and 22 for maintaining the regulated voltage. As mentioned above, the inductor current and duration of phases can vary from cycle to cycle. It is to be understood that the switching frequency and cycle period can be fixed (typical for most applications) or the switching frequency and cycle period can be variable.

Figure 3:
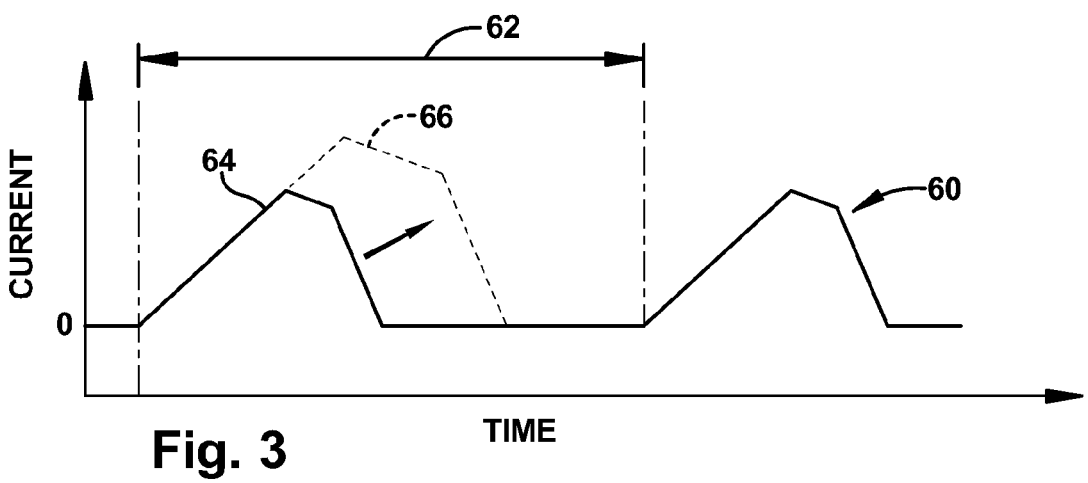
FIG. 3 is an example graph depicting inductor current verses time for varying output power according to an aspect of the present invention.

FIG. 3 depicts an example of inductor current through an inductor in a system that can adjust to accommodate variable regulated voltage requirements of the loads 12 and 14. The system can implement adjustments (e.g., at start up or dynamically during operation) as a function of the inputs $IN_A$ and $IN_B$. The inductor current 60 can also implement slope compensation to mitigate sub-harmonic oscillation that might occur during operation of the switching regulating system. The slope of the current through the inductor generally will vary as a function of the battery voltage that supplies power to the inductor, the output voltage during the respective portion in which the output is coupled to the inductor and the inductance of the respective inductor. In FIG. 3 the inductor current has a cycle indicated at 62 and has substantially constant slope during each phase of the cycle 62. The slope during the first portion of the cycle 62, indicated at 64, corresponds to the $V_{BAT}/L$. Similarly, during the portion of the cycle in which load A is coupled to the inductor 16 (e.g., through switch device 20), the slope corresponds to $(V_{BAT}-V_{OUT\_A})/L$. During the portion of the cycle when load B is coupled to the inductor (e.g., through switch device 22), the slope corresponds to $(V_{BAT}-V_{OUT\_B})/L$.

The dotted line 66 depicted in FIG. 3 corresponds to a situation in which an increased regulated output voltage is required for one or more of the respective load 12 and 14, for example. Thus, when a greater output voltage is required, the first phase of the cycle in which the inductor current 60 ramps up lasts an extended period of time so that a greater amount of energy is stored at the inductor. Thus, in order to accommodate and store sufficient electrical energy to provide the increased regulated output voltages, the control system draws current through the inductor for a correspondingly increased length of time. It is to be understood and appreciated that the output voltages and associated current can be dynamically adjusted by controlling the respective durations in which the inductor is charged and that the respective switch devices are activated each cycle (e.g., about two microseconds). When the inductor current 60 is increased to the wave form shown at 66, for example, the discontinuous mode between adjacent cycles will decrease accordingly for a fixed switching cycle.

Figure 4:
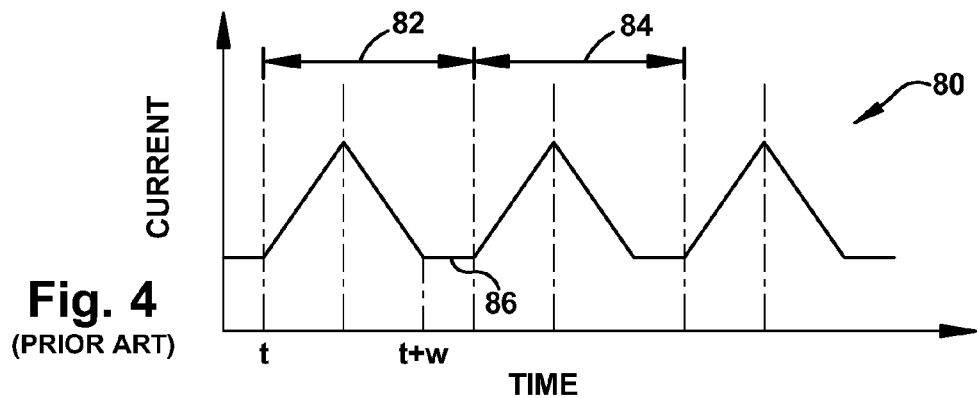
FIG. 4 is a prior art figure depicting input current verses time illustrating a conventional approach for providing regulated power to multiple loads.

By way of comparison, FIG. 4 depicts a prior art example of waveforms that can be utilized in a similar type of circuit for driving multiple outputs with a single energy storage element, such as an inductor. The inductor current waveform 80 operates in two half cycles 82 and 84 that form a complete switching cycle. In the first half cycle 82 the inductor current increases to a peak current and then corresponding switching circuitry is activated to provide the regulated output for a second portion of the cycle 82 until time t+w. At time t+w, the inductor current has decreased to about zero due to discharging the energy stored in the inductor to drive the associated output. After a short discontinuous mode 86, the second half cycle 84 begins. In the second half cycle 84, the inductor current 80 increases again to a peak current for storing energy and then the second switch device is activated to maintain the regulated voltage at the respective other output.

The prior art solution shown in FIG. 4 is substantially less efficient than the approach shown in FIGS. 1, 2 and 3. For instance, for a fixed switching frequency and configuration of storage element (e.g., an inductor) more power can be delivered with the control scheme of FIG. 2 than with the approach shown in FIG. 4. Additionally, the control scheme of FIGS. 2 and 3 exhibit reduced switching losses since the storage element 16 is charged only once per cycle, compared to twice with the approach of FIG. 4.

Figure 5:
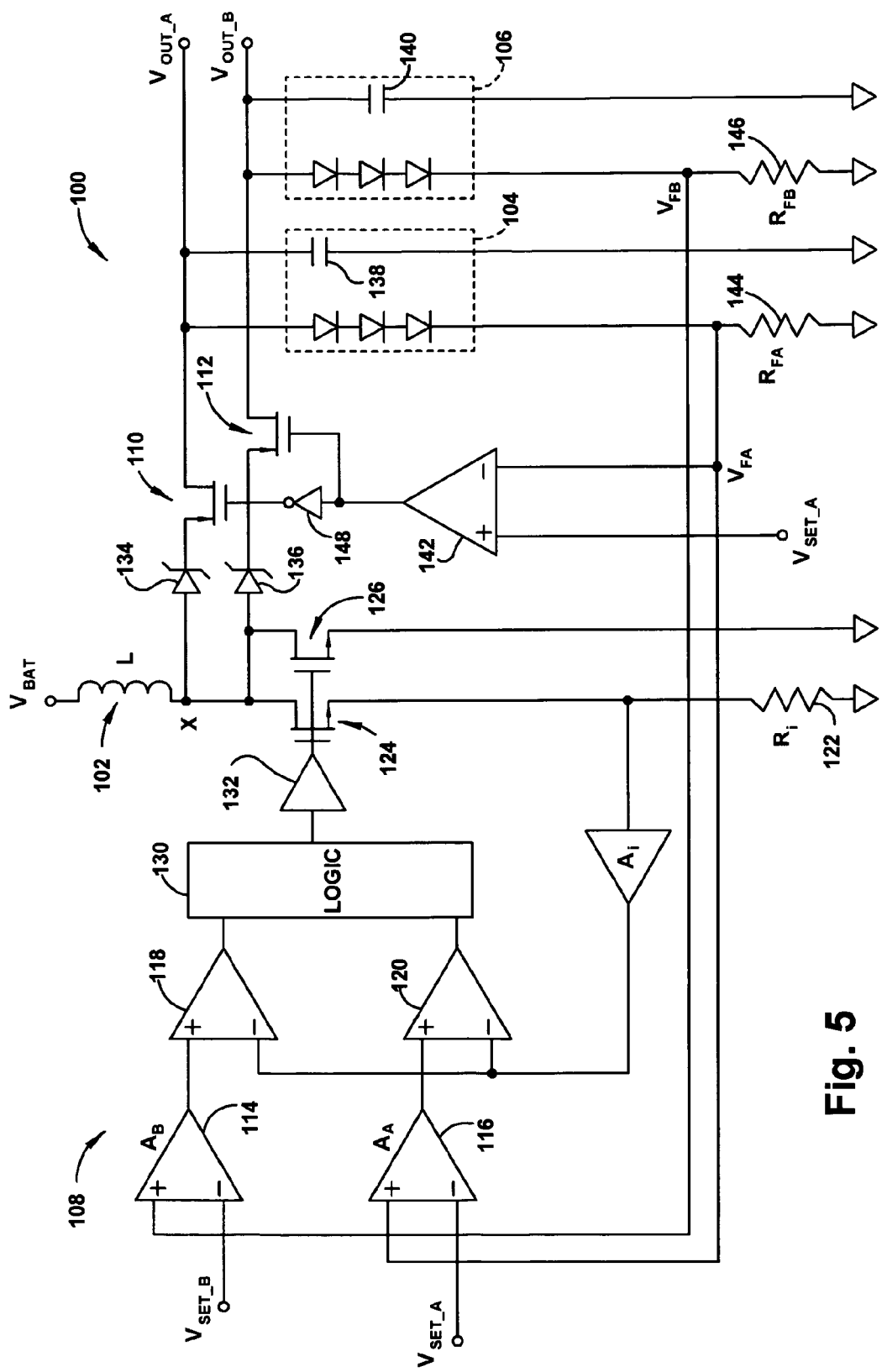
FIG. 5 depicts an example of a converter system that can be utilized to drive multiple outputs according to an aspect of the present invention.

FIG. 5 depicts an example of a circuit diagram for a switching regulation system 100. In the example of FIG. 5, the switching regulation system employs a single inductive energy storage element 102 having an inductance L (from one or more inductors) to provide electrical energy to multiple outputs, such as $V_{OUT\_A}$ and $V_{OUT\_B}$. The output voltage $V_{OUT\_A}$ is utilized to drive a load 104, and the output $V_{OUT\_B}$ is utilized to drive another load 106. The respective regulated outputs $V_{OUT\_A}$ and $V_{OUT\_B}$ can be set as a function of input signals. For instance, an input voltage $V_{SET\_A}$ can be utilized to set the regulated $V_{OUT\_A}$ and input $V_{SET\_B}$ can be utilized to set $V_{OUT\_B}$.

A control system 108 is programmed and/or configured to control current through the inductor 102 as well as to control switch devices 110 and 112 for maintaining predetermined regulated voltages at $V_{OUT\_A}$ and $V_{OUT\_B}$. In FIG. 5, the switch devices 110 and 112 are depicted as p-channel metal oxide semiconductor field effect transistors (MOSFETs). Those skilled in the art will understand and appreciate other types of switch devices can be employed for routing current from the inductor 102.

The control system 108 includes error amplifiers 114 and 116. The input voltages $V_{SET\_A}$ and $V_{SET\_B}$ are provided to inverting inputs of the respective error amplifiers 116 and 114. Feedback voltage $V_{FA}$ is provided to the non-inverting input of error amplifier 116 and feedback voltage $V_{FB}$ is provided to the non-inverting input of error amplifier 114. Each of the feedback voltages $V_{FA}$ and $V_{FB}$ provides an indication of the current through each respective load 104 and 106. The error amplifiers 114 and 116 provide respective error output signals to comparators 118 and 120. The error output signals indicate whether the regulated output has a predetermined relationship relative to the input voltages $V_{SET\_A}$ and $V_{SET\_B}$. An indication of the current through the inductor 102 is provided to the inverting input of the respective comparators 118 and 120. In the example of FIG. 5, the current through the inductor 102 is determined based on the voltage across a resistor 122 having a resistance $R_I$. Resistor $R_I$ is connected in series with the inductor 102 and an n-channel MOSFET. Another n-MOSFET can be connected in parallel with the series combination of resistor 122 and n-MOSFET 124.

The control system 108 controls the n-MOSFETs 124 and 126 to ramp up current through the inductor 102 for storing electrical energy in the inductor each switching cycle that the system is enabled. The comparators 118 and 120 provide corresponding outputs to logic block 130. For example, the comparators 118 and 120 detect crossing points between the regulated outputs and the current through the inductor. The relative crossing points detected by the comparators 118 and 120 establish the energy requirements for the loads 104 and 106. The logic block 130 determines and controls the duty cycle of the inductor current according to which of the crossing points is longer.

The logic block 130, for example, can be digital logic that is configured to control the n-MOSFETs 124 and 126 based upon the comparisons performed by comparators 118 and 120. The logic 130 controls the N-MOSFETs 124 and 126 based on which of the comparator output signals has the longest duty cycle so that sufficient electrical energy can be stored in the inductor 102 for driving multiple outputs, namely loads 104 and 106. The logic block 130 can be coupled to the gate control inputs of the N-MOSFETs 124 and 126 through a buffer 132. Other circuitry can also be used to provide control signals to drive the switch devices 124 and 126.

Each of the switch devices 110 and 112 can be coupled to the inductor 102 through corresponding diodes 134 and 136. In the example of FIG. 5, the diodes 134 and 136 are depicted as Schottky diodes. Other types of diodes can also be utilized depending on performance requirements as well as other design considerations. To help provide substantially constant DC voltage at the respective outputs capacitors 138 and 140 can be connected in parallel with the respective loads 104 and 106.

From the foregoing, it is to be appreciated that each of the regulated outputs has a corresponding control loop. The control loop associated with the load 104 (at output A) includes the diode 134, the p-MOSFET 110, the load 104, the feedback voltage $V_{FA}$, the error amplifier 116, the comparator 120, and the logic 130. Similarly, the control loop for the output B that is associated with driving load 106 includes the diode 136, p-MOSFET 112, the load 106, the feedback voltage $V_{FB}$ the error amplifier 114, the comparator 118, and the logic 130. Each of these control loops cooperate to ensure that sufficient energy is stored in the inductor 102 during a first part of each switching cycle. The energy stored in the inductor can vary each cycle according to which of the loads 104 and 106 requires greater energy, which is indicated by the duty cycle of the error output signals.

According to an aspect of the present invention, the control of the output switch devices 110 and 112 can further be implemented by another control loop comprising a comparator 142 that receives, as inputs, the $V_{SET\_A}$ input and the feedback voltage $V_{FA}$. As mentioned above, feedback voltage $V_{FA}$ corresponds to the electrical current through the load 104 as indicated through the resistor 144 having a resistance $R_{FA}$. Similarly, the feedback voltage $V_{FB}$ corresponds to the electrical current through the load 106 as indicated through the resistor 146 having a resistance $R_{FB}$. The comparator 142 controls switching of the output switch devices 110 and 112 as a function of $V_{SET\_A}$ and $V_{FA}$. In particular, the comparator 142 controls when to deactivate the switch device 110 to a non-conductive state and to activate the switch device 112 to a conductive state each switching cycle (provided that the switch device is enabled). The comparator 142 is coupled to the gate of the p-MOSFET 110 through an inverter 148 for driving the p-MOSFET. A buffer (not shown) can also be connected between the comparator 138 and the p-MOSFET 112 for driving the switch device 112.

Based on the control implemented by the comparator 142, the comparator 142 activates switch device 110 to deliver electrical energy from the inductor 102 to the load 104 during a first phase of the inductor discharge period, namely until $V_{FA}$ equals $V_{SET\_A}$. The remaining portion of the energy stored in the inductor 102 during this discharge period is delivered to the load 106 through the switch device 112, which is triggered concurrently with turning off the switch device 110 by the comparator 142. Thus, the comparator 142 adjusts the duty cycles for the switch devices 110 and 112 to provide an appropriate amount of electrical energy to regulate the loads 104 and 106. Those skilled in the art will understand that similar control can be implemented with respect to the set voltage $V_{SET\_B}$ and the feedback voltage $V_{FB}$.

Figure 6:
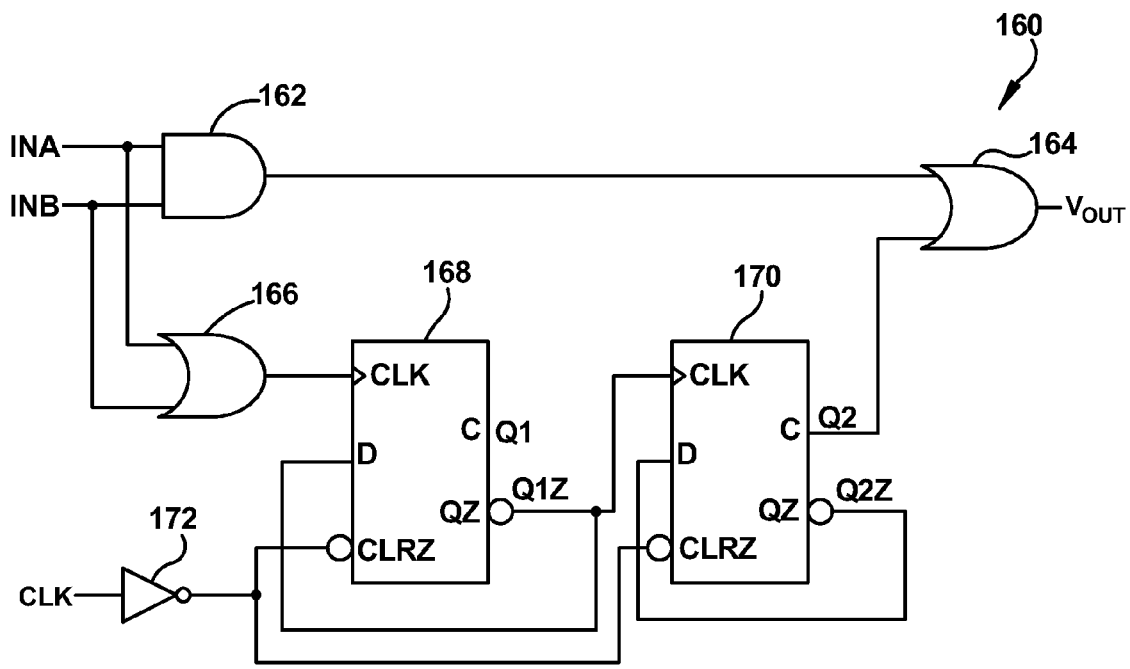
FIG. 6 depicts an example of logic that can be utilized to select a longest duty cycle for a converter system implemented according to an aspect of the present invention.

FIG. 6 depicts an example of a circuit 160 that can be employed to select a longest duty cycle between a pair of input signals, indicated at INA and INB. The circuit 160 can be employed as the logic 130 shown and described in FIG. 5. The input signals INA and INB are provided to an AND gate 162 that drives an input of an OR-gate 164. The output of the OR-gate 164 provides the output of the circuit 160, namely corresponding to a longest duty cycle of the respective inputs INA and INB. The inputs INA and INB are also provided as inputs to another OR-gate 166, which provide a logic output to a clock (CLK) input of a flip-flop 168. In the example of FIG. 6, the flip-flop is a D-flip-flop. The inverted output (Q1Z) of the flip-flop 168 is fed back as the input of the flip-flop as well as is provided as a clock input to a second flip-flop 170. A clock (CLK) signal is inverted by an inverter 172 for providing an inverted version of the clock signal to a clear input of both flip-flops 168 and 170 to reset the respective outputs Q1Z and the output Q2Z. The inverted output Q2Z of the second flip-flop 170 is also fed back as the D-input of the flip flop. A non-inverted output Q2 of the second flip-flop 170 is provided as an input to the OR-gate 164. Thus, the output of the circuit 160 is thus provided by an ORing of the output of AND-gate 162 and Q2, thereby providing an indication of the longest duty cycle among the input signals INA and INB.

Figure 7:
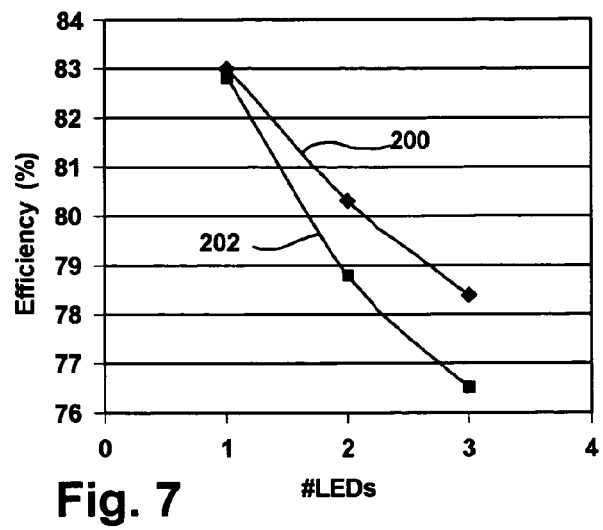
FIG. 7 is an example graph depicting efficiency of a control circuit driving multiple loads according to an aspect of the present invention.

FIG. 7 is a graph depicting a comparison of efficiency measured for a switching regulation system that can be implemented according to an aspect of the present invention. In FIG. 7, a first curve 200 corresponds to measured efficiency (represented as a percentage) as a function of the number of LEDs connected at each output being driven by about 10 mA. The other curve 202 corresponds to measured efficiency (represented as a percentage) as a function of the number of LEDs connected at each output being driven by about 28 mA. From FIG. 7, it is shown that the efficiency for three LEDs still exceeds 75%, which significantly exceeds the efficiency (e.g., less than about 65%) that can be achieved by a conventional approach implementing the switching scheme depicted in FIG. 4.

Figure 8:
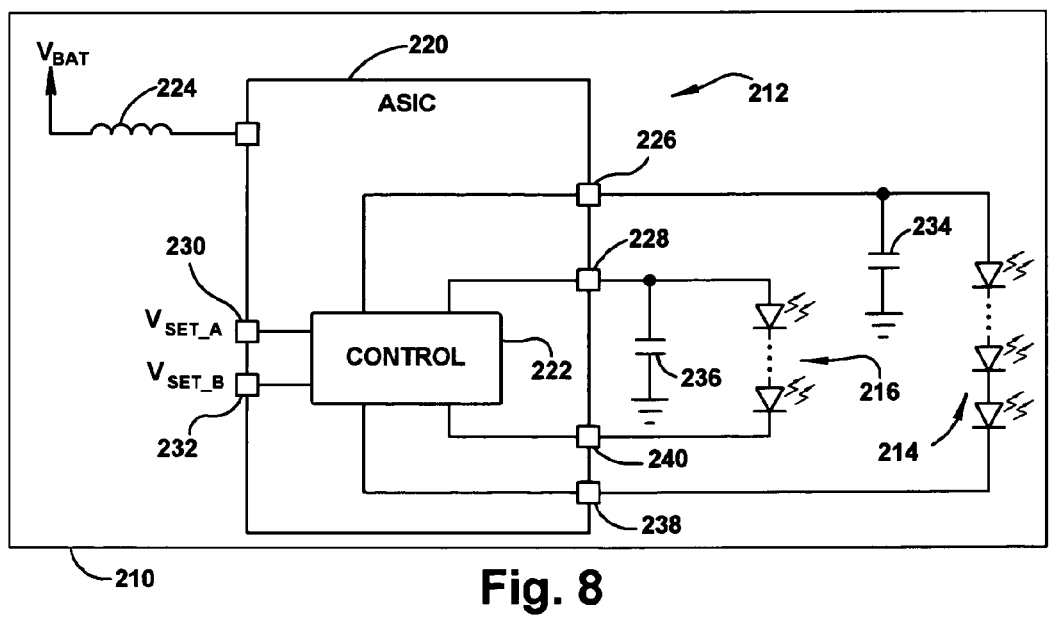
FIG. 8 of an LED power system that can be implemented according to an aspect of the present invention.

FIG. 8 depicts an example of a portable electronic device 210, such as a cellular telephone, personal digital assistant (PDA) or other device, implementing a switching regulation system 212 for driving plural sets of LEDs 214 and 216 according to an aspect of the present invention. The LEDs 214 and 216, for example, can be white LED's, such as may be utilized for providing backlighting for a LCD panel of the portable electronic device 210. The regulation system 212 includes an ASIC 220 that implements switching regulation to provide regulated voltage and current to each set of LEDs 214 and 216. For instance, the ASIC 220 includes a control circuit 222. The control circuit 222 controls an arrangement of switch devices (not shown) to store energy in an associated inductor 224 sufficient to supply electrical energy for driving the output loads corresponding to the sets of LEDs 214 and 216. Current through the sets of LEDs 214 and 216 is fed back to the control circuit 222 through corresponding inputs 238 and 240. The control circuit 222 can implement control loops based at least in part on the feedback signals provided at 238 and 240. Examples of switching systems and control schemes that can be utilized to implement the control circuit 222 are shown and described with respect to FIGS. 1, 2, 3 and 5.

While each set of LEDs 214 and 216 is depicted as including more than one LED, it is to be appreciated that any number of one or more LEDs (or other types of loads) can be driven by the switching regulation system implemented in the ASIC 212. The regulated output voltages are provided as predetermined regulated voltages at output terminals 226 and 228 of the ASIC 212. For example, the regulated output voltages at terminals 226 and 228 can be provided based on respective input voltages $V_{SET\_A}$ and $V_{SET\_B}$, which are provided at input terminals 230 and 232, respectively. To facilitate maintaining a constant DC regulated voltage at the output terminals 226 and 228, capacitors 234 and 236 can be connected in parallel with the respective loads 214 and 216.

What have been described above are examples of the present invention. It is, of course, not possible to describe every conceivable combination of components or methodologies for purposes of describing the present invention, but one of ordinary skill in the art will recognize that many further combinations and permutations of the present invention are possible. For example, layers of a conductive pad can be manufactured in varying dimensions dependent upon application requirements. Accordingly, the present invention is intended to embrace all such alterations, modifications, and variations that fall within the spirit and scope of the appended claims.

What is claimed is:

1. A power converter comprising:
   at least two switch devices coupled to receive electrical energy from a common energy storage device, each of the at least two switch devices being coupled to regulate an associated output; and
   a control system that after causing electrical energy to be stored in the common energy storage device during a first portion of a given cycle, controls the at least two switch devices consecutively to deliver the stored electrical energy to the associated output during a second portion of the given cycle and to provide a discontinuous mode prior to beginning the first portion of a next cycle, wherein the control system adjusts a duration of the first portion of the given cycle for providing current through the common energy storage device as a function of input signals that define regulated electrical energy requirements for each associated output so that sufficient energy is stored in the common energy storage device, the duration of the discontinuous mode changing to accommodate variations in the duration of the first portion and the second portion of the given cycle.

2. The power converter of claim 1, wherein the control system controls the at least two switch devices in a continuous mode during the second portion of the given cycle and then in the discontinuous mode prior to beginning the first portion of the next cycle.

3. The power converter of claim 1, wherein the control system further comprises a control loop associated with each of the at least two switch devices, the control system further comprising logic that controls current through the energy storage device during the first portion of the given cycle based on relative energy requirements for each of the associated outputs.

4. The power converter of claim 3, wherein each of the control loops associated with the at least two switch devices further comprises:
   an error amplifier that provides an error signal having a duty cycle indicative of the energy requirements for the associated output, the error signal being determined based on a respective input signal relative to a feedback signal indicative of load current for the associated output; and
   a comparator that provides a comparator output signal indicative of a crossing condition based on a comparison of the error signal relative to an indication of current through the energy storage device,
   wherein the logic sets a duty cycle for the current through the energy storage device during the first portion of the given cycle based on which comparator output signal for a respective one of the control loops indicates that a crossing condition occurs latest in time.

5. The power converter of claim 3, wherein the control system further comprises another control loop that controls switching between the at least two switch devices during the second portion of the given cycle.

6. The power converter of claim 5, wherein the another control loop further comprises a comparator that compares a feedback signal from one of the associated outputs with a predetermined input signal that sets a regulated value for the one of the associated outputs to control switching between the at least two switch devices during the second portion of the given cycle.

7. The power converter of claim 3, further comprising a load connected at each of the associated outputs, each of the loads being driven based on the electrical energy delivered during consecutive phases of the second portion of the given cycle, an indication of current through each of the loads being provided as feedback to each of the control loops.

8. The power converter of claim 7, wherein the each of the loads comprises at least one light emitting diode.

9. The power converter of claim 1, wherein the common energy storage device comprises at least one inductor.

10. An integrated circuit comprising the power converter of claim 1.

11. A control system for regulating multiple outputs, comprising:
    first means for, when activated, electrically coupling an energy storage element with a first output of the multiple outputs;
    second means for, when activated, electrically coupling the energy storage element with a second output of the multiple outputs;
    means for causing current through the energy storage element during a first portion of a given cycle to store electrical energy in the energy storage element, wherein the means for causing controls the current through the energy storage element based on the indication of electrical current through the first load relative to a first input signal and based on the indication of electrical current through the second load relative to a second input signal;
    means for consecutively activating the first means and the second means such that stored electrical energy is delivered from the energy storage element to the first output during a first phase of a second portion of the given cycle and such that stored electrical energy is delivered from the energy storage element to the second output during a second phase of the second portion of the given cycle and a discontinuous phase prior to beginning the first phase of a next cycle, wherein the means for consecutively activating controls the first and second means based on at least one of the indication of electrical current through the first load and the indication of electrical current through the second load relative to at least one of the respective first input signal and the second input signal;
    means for feeding back an indication of electrical current through a first load connected at the first output;
    means for feeding back an indication of electrical current through a second load connected at the second output; and
    logic means for controlling a duty cycle of the current through the energy storage element during the first portion of the given cycle according to which of the first and second loads have greater energy requirements.

12. The system of claim 11, further comprising means for determining the energy requirements of each of the first and second loads by comparing the indication of electrical current through the first load relative to the first input signal and by comparing the indication of electrical current through the second load relative to the second input signal.

13. The system of claim 11, wherein each of the first and second loads comprises at least one light emitting diode.

14. An integrated circuit comprising the system of claim 11.

15. A power converter comprising:

current input operative to receive electrical current from an associated energy storage element;

a first switch device coupled between the current input and a first output;

a second switch device coupled between the current input and a second output;

a first control loop that feeds back an indication of current through a first load connected at the first output and determines energy requirements of the first load based on the indication of current through the first load relative to a predetermined first input signal that sets regulated energy requirements for the first load;

a second control loop that feeds back an indication of current through a second load connected at the second output and determines energy requirements of the second load based on the indication of current through the second load relative to a predetermined second input signal that sets regulated energy requirement for the second load;

logic that controls a duty cycle of current through the energy storage element based on the relative energy requirements of the first load and the second load such that sufficient energy is stored in the energy storage element during a first portion of a given cycle; and a third control loop that controls the first switch device to deliver stored electrical energy from the energy storage element to the first output during a first phase of a second portion of the given cycle and that controls the second switch device to deliver stored electrical energy from the energy storage element to the second output during a second phase of a second portion of the given cycle, the first and second phases of the second portion of the given cycle occurring consecutively in a continuous mode.

16. The power converter of claim 15, wherein the first load comprises at least one light emitting diode and the second load comprises at least one light emitting diode.

17. An integrated circuit comprising the power converter of claim 15, wherein the energy storage element comprises an inductor.

\* \* \* \* \*